March 28, 1939.  R. A. GOEPFRICH  2,152,041
BRAKE
Filed Aug. 27, 1936   5 Sheets-Sheet 1
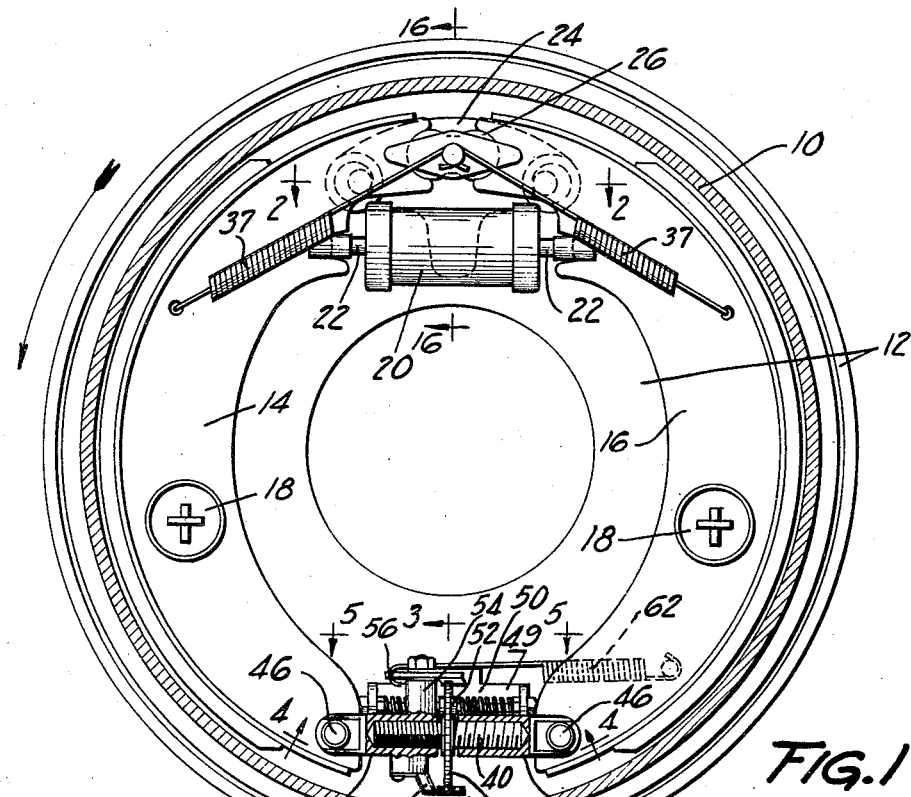
FIG.1
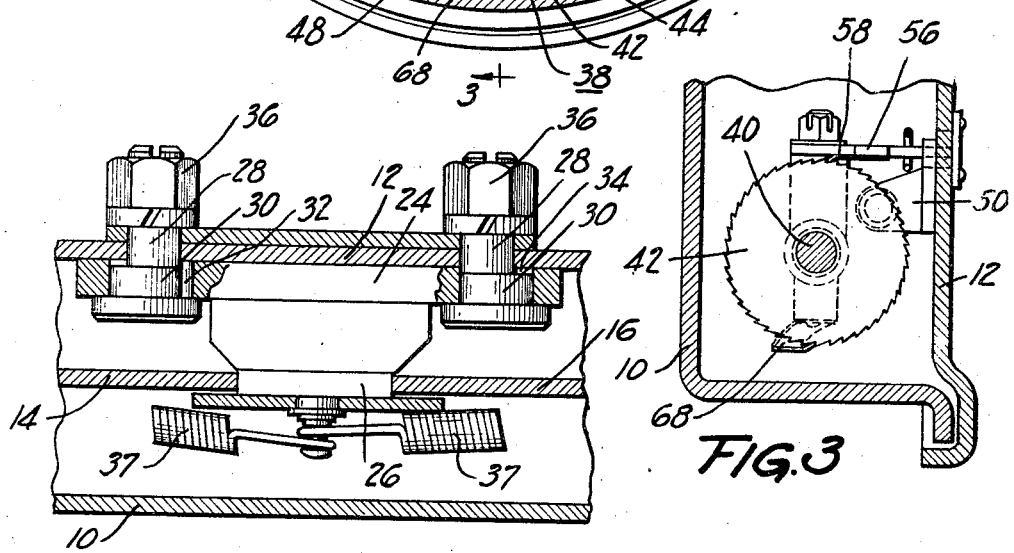
FIG.2
FIG.3
INVENTOR
RUDOLPH A. GOEPFRICH
BY
ATTORNEY March 28, 1939. R. A. GOEPFRICH 2,152,041
BRAKE
Filed Aug. 27, 1936   5 Sheets-Sheet 2

INVENTOR
RUDOLPH A. GOEPFRICH
BY
ATTORNEY

March 28, 1939.  R. A. GOEPFRICH  2,152,041

BRAKE

Filed Aug. 27, 1936  5 Sheets—Sheet 3

INVENTOR
RUDOLPH A. GOEPFRICH
BY
ATTORNEY

March 28, 1939.    R. A. GOEPFRICH    2,152,041
BRAKE
Filed Aug. 27, 1936    5 Sheets-Sheet 4

INVENTOR
RUDOLPH A. GOEPFRICH
BY
M. W. McConkey
ATTORNEY

March 28, 1939.　　　R. A. GOEPFRICH　　　2,152,041
BRAKE
Filed Aug. 27, 1936　　　5 Sheets-Sheet 5

INVENTOR
RUDOLPH A. GOEPFRICH
BY
ATTORNEY

Patented Mar. 28, 1939

2,152,041

UNITED STATES PATENT OFFICE 2,152,041

BRAKE

Rudolph A. Goepfrich, South Bend, Ind., assignor to Bendix Products Corporation, South Bend, Ind., a corporation of Indiana Application August 27, 1936, Serial No. 98,210

9 Claims. (Cl. 188—79.5)

This invention relates to brakes and more particularly to adjusting devices therefor, and is illustrated as applied to a brake of the internal-expanding shiftable-anchorage type.

One object of the invention is to provide automatic means for accomplishing complete service adjustment of a brake.

Another object is to provide adjusting devices operable by the shifting of the shoes in a shiftable anchorage brake.

Another object is to provide an adjusting device which makes very minute adjustments.

Still another object is to provide an automatic centering device for supporting the shoes of a brake in proper relation to the drum.

Other objects comprise the use of a single anchor providing separate adjustment for the anchorage of both shoes in a shiftable anchorage brake, the formation of a hydraulic cylinder in an integral structure with such anchorage, and the provision of a pair of adjacent anchors providing individual adjustment for the shoes.

I prefer to accomplish some of the above objects by providing sockets in thrust relation to the floating ends of the shoes, and providing a thrust member between the sockets, at least one end of which threadedly engages one of the sockets. A ratchet wheel on the thrust member is operatively engaged by a pawl secured to a lever adapted to rest against an abutment upon the brake backing plate against which it may be urged by a suitable spring.

I prefer to form very fine teeth upon the ratchet wheel, and if a double screw-threaded thrust member is used, to employ a lost motion device between the lever and the pawl in order to provide minute increments of adjustment.

For centering the shoes the invention provides a sensing element adapted to follow the movements of the shoes and which moves freely a distance equal to the normal clearance of the shoes but which engages a stop element and moves it to a new position upon excessive movement of the shoes.

The above and other objects and particular constructions of my invention will more fully appear in the following detailed description of the several embodiments illustrated in the accompanying drawings, in which:

Figure 1 is a vertical section through one form of brake embodying my invention, just inside the head of the brake drum, and showing the shoes in side elevation;

Figure 2 is a partial section, on the line 2—2 of Figure 1, through the anchoring means;

Figure 3 is a partial section, on the line 3—3 of Figure 1, showing a transverse section of the automatic adjusting device;

Figure 4:
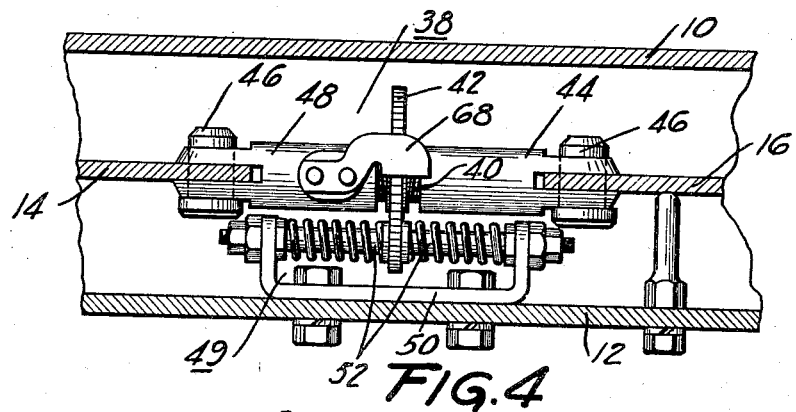
Figure 4 is a partial section on the line 4—4 of Figure 1, showing a top plan view of the automatic adjuster.

Referring to Figures 1 to 5 inclusive and 16, the preferred embodiment of my invention comprises the usual rotatable drum 10 at the open side of which is a support, such as a backing plate 12, and within which is arranged the friction means of the brake. The friction means comprises a pair of identical rigid shoes 14 and 16 preferably T-shaped in cross-section, and provided with suitable steady rests 18. The shoe 14 is the primary or leading shoe in forward braking, and 16 is the secondary shoe.

The brake is applied by means of a double piston hydraulic cylinder 20 having piston rods 22 engaging each shoe and applying to each an equal force. According to an important minor feature of the invention the cylinder 20 is formed integrally with a flange 24 adapted to be adjustably secured to the backing plate, and having rigidly formed thereon, radially outwardly of the cylinder 20, my novel individually-adjustable anchor.

The anchor comprises a projection 26 formed with two cylindrical lobes spaced circumferentially of the brake, each of which is adapted to be engaged respectively by a semicircular notch formed in one end of each shoe.

The flange 24 is secured to the backing plate by two bolts 28 projecting through the backing plate 12 and having eccentric portions 30 passing through two openings 32 and 34 widely spaced in the flange. The bolts 28 are provided with heads engaging the inner surface of the flange and with nuts 36 engaging the outer face of the backing plate (see Figure 2). Screwdriver slots on the outer ends of the bolts permit them to be turned (when the nuts have been loosened) to cause the eccentric portions 30 to shift one or both ends of the anchor-carrying flange radially inwardly or outwardly. The opening 32 in the flange is elongated circumferentially to permit the circumferential shifting which necessarily attends the operation of the eccentrics. By shifting one end of the flange more than the other, the integral flange, anchor, and cylinder unit is rotated about an axis parallel to the brake axis, bringing the shoe end engaging one anchor lobe closer to the drum than the other. This constitutes the individual adjustment whereby both shoe ends may be placed in proper relation to the drum.

Return springs 37 are tensioned between the shoes 14 and 16 and the anchor, and serve to maintain the shoes in contact with the anchor when the brake is released.

The opposite ends of the shoes are connected by my novel automatic adjusting device, indicated generally by the numeral 38, which forms in effect a floating thrust member between the shoes.

The device 38 comprises a right and left hand screw member 40 provided, midway of its length, with a fine-tooth ratchet wheel 42, and having threaded on each end respectively, internally threaded sockets 44 and 48. Each of these sockets is slotted at its outer end to receive the web of one of the shoes 14 or 16 and is pivoted thereto by a pin 46.

A centering device, designated by the reference numeral 49, of the general type disclosed and claimed in Patent No. 1,940,471 issued to A. P. Thomas on December 19, 1933, forms an integral part of my novel automatic adjusting device. It acts on the ratchet wheel to return the shoes to inoperative position when the brake is released and to support the shoes in central relation to the drum when in released position. It comprises a metal strap 50 adjustably secured by bolts, or the like, to the backing plate 12 and having its ends bent inwardly to carry two opposed spring-pressed plungers 52 acting on opposite sides of the ratchet wheel.

Figure 5:
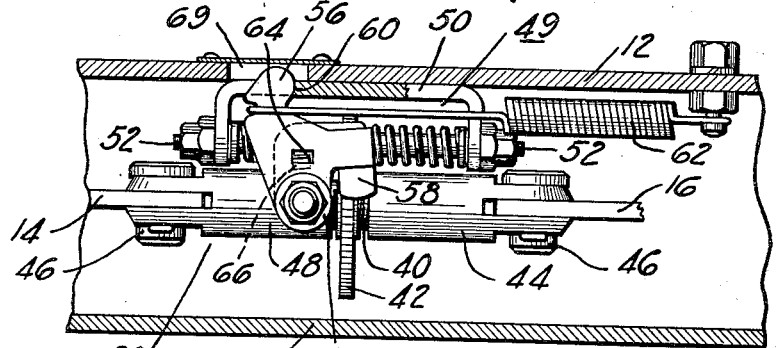
Figure 5 is a partial section on the line 5—5 of Figure 1, showing a bottom plan view of the adjuster.
Figure 8:
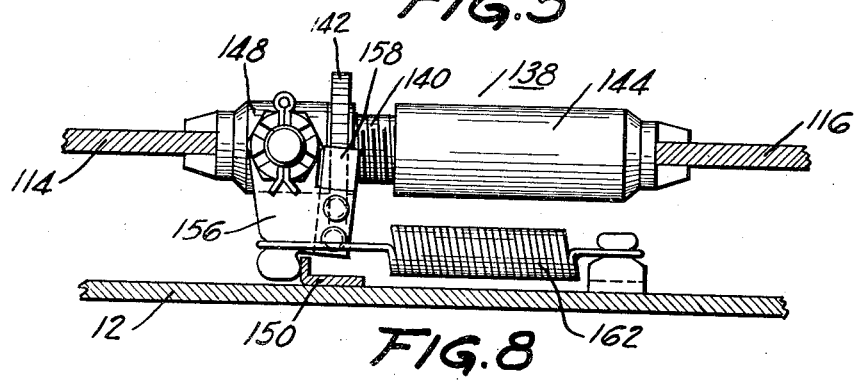
Figure 8 is a partial section on the line 8—8 of Figure 6, showing a bottom plan view of the automatic adjuster.
Figure 9:
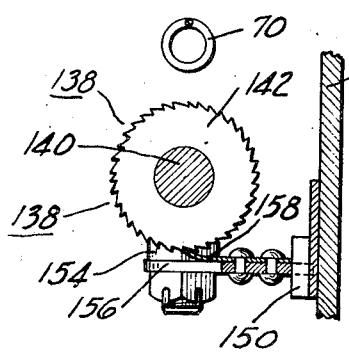
Figure 9 is a partial section on the line 9—9 of Figure 6, transversely through the automatic adjuster.
Figure 6:
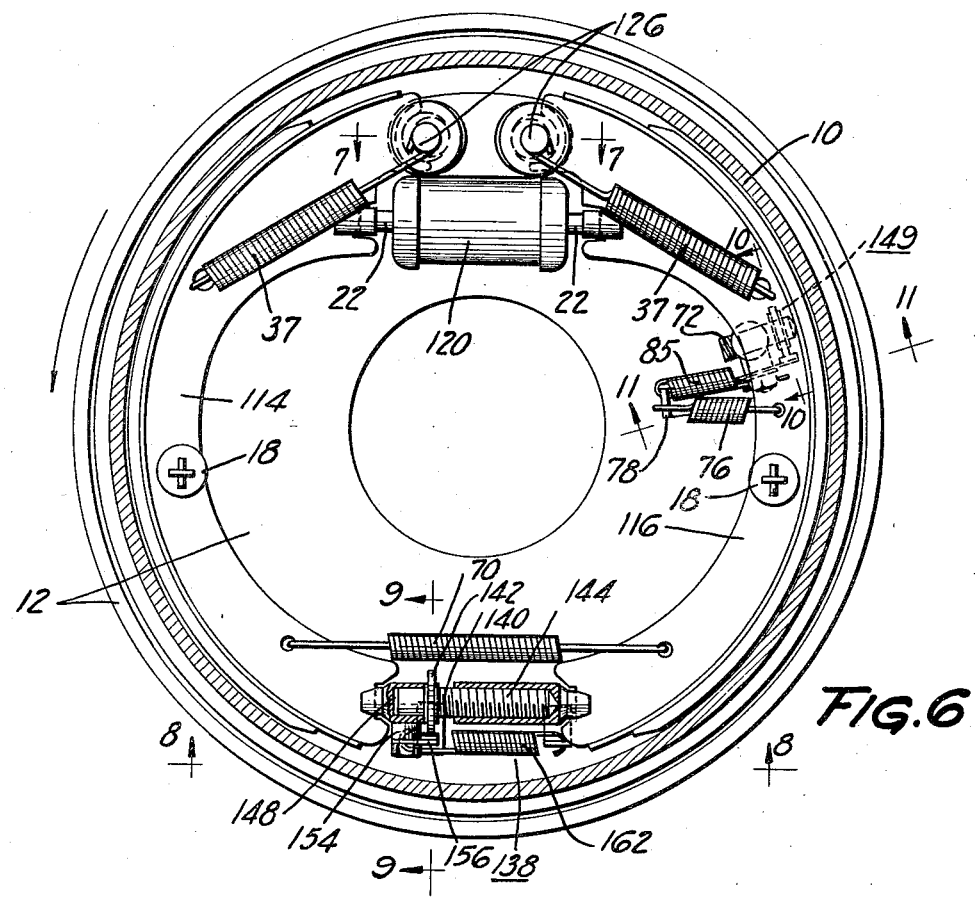
Figure 6 is a section corresponding to Figure 1, but showing a modification.
Figure 7:
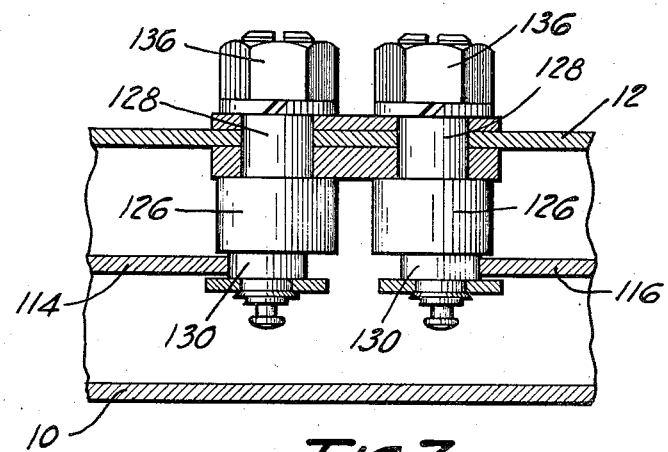
Figure 7 is a partial section on the line 7—7 of Figure 6, through the anchoring means.
Figure 10:
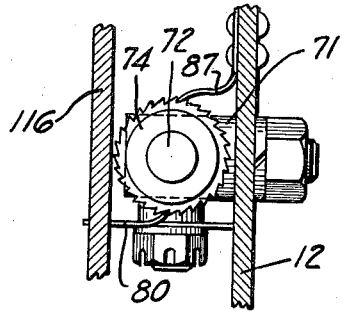
Figure 10 is a partial section on the line 10—10 of Figure 6, showing the automatic centering mechanism in end plan view.

The socket 48 is formed with a projection 54 extending radially inwardly of the brake to a point adjacent the periphery of the ratchet wheel 42. Pivoted coaxially thereon are two levers 56 and 58. The outer lever 56 is formed of heavy stock and is urged against an abutment 60 on the member 50 by a spring 62. The inner lever 58 is of thin spring steel and constitutes a pawl adapted to engage the teeth of the ratchet wheel 42 to turn it when the lever is rotated in a clockwise direction (Figure 5). The two levers 56 and 58 are interconnected by means of a rectangular hole 64 formed in the lever 56 into which projects a tongue 66 struck from the thin metal of the lever 58. A certain amount of lost motion is provided here by making the width of the hole 64 greater than that of the tongue 66.

A second projection on the socket 48 on the opposite side thereof has secured thereto a spring steel pawl 68 which prevents the ratchet wheel from "backing up".

An opening 69 in the backing plate permits access to the lever 56 from outside the brake for emergency manual adjustment thereof.

In operation, when the brake is applied in forward braking, the primary shoe 14 leaves the anchor and is carried by the rotating drum 10 in the direction of the arrow (Figure 1), and the torque of this shoe is transmitted through the adjusting device 38 to apply the secondary shoe. This results in a translation of the adjusting device to the right (Figures 1, 4 or 5) which rotates the lever 56, engaging the fixed stop 60, in a counterclockwise direction. If the brake is sufficiently worn, lever 58 will also be rotated by engagement of the parts 64, 66 and this rotation may be sufficient to permit the lever to engage a new tooth on the ratchet wheel 42. When the brake is released, the centering device 50—52 brings the adjusting device back to its original position, thus permitting the spring 62 to rotate lever 56 back in the clockwise direction. This advances the ratchet wheel one tooth and thus expands the shoes. When proper clearance exists, the movement of the lever 58 is insufficient to engage a new tooth on each application of the brake.

In reverse braking, the adjusting device is translated to the left, the secondary shoe becoming the leading shoe. The spring 62 urges the lever 56 in a clockwise direction (the direction to expand the shoes) but the braking torque which is being transmitted through the adjuster increases the force required to rotate the lever, so that the spring 62 is stretched without producing any rotation thereof. Consequently no adjustment occurs in reverse braking.

Due to the fact that the secondary shoe 16 is usually applied with greater force than the primary shoe and therefore wears faster, the pitch of the left-hand thread engaging the socket 44 is preferably about twice that of the pitch of the right-hand thread engaging socket 48. This eliminates the necessity of periodic adjustments of the centering device, and eliminates the danger that the primary shoe will drag when the clearance of the secondary shoe is correct.

Another important feature of the construction of this device is the use of very fine pitch teeth on the ratchet wheel 42, and in combination therewith, the use of the lost motion elements 64—66, whereby a very fine adjustment is made. This should generally be of such nature that approximately one hundred brake applications would be required to take up the normal clearance. Thus, if the brake is heated by application on a long hill, and thereby caused to expand, unless brake applications were made with much greater than normal frequency, it would be impossible to reduce the clearance materially before the brake cooled off again.

The modified brake illustrated in Figures 6 to 11 inclusive is constructed generally similarly to the foregoing, and identical parts therein are designated by the same reference numeral while corresponding parts are designated by the same reference numeral plus one hundred.

In this brake the hydraulic cylinder 120 is separately secured to the backing plate in any desired manner, and a separate adjustable anchor 126 is provided for each of the shoes 114 and 116. These anchors are located radially outwardly of the cylinder 120, and are spaced circumferentially a distance permitting application of a wrench to the securing nuts 136. The anchors comprise threaded bolts 128 adapted to be secured in the backing plate 112 and provided with cylindrical shoe-engaging parts 130 eccentrically located on the bolts. Screw driver slots on the bolts permit them to be rotated from outside the backing plate to separately adjust the position of the anchor engaging ends of the shoes.

The opposite ends of the shoes are not pivoted to the adjuster 138 but are notched, and held in thrust relationship with the adjuster by means of a spring 70 tensioned between the shoe ends.

The adjusting screw member 140 is rotatably seated in the socket 148 and has only one threaded part, which engages the socket 144.

The projection 154 formed on the socket 148 extends radially outward and carries the adjusting lever 156 which has rigidly secured to it the spring steel pawl 158. The lever 156 engages an abutment 150 secured to the backing plate 12 and is urged thereagainst by the spring 162.

An important feature of my invention resides in the novel automatic centering device 149 which, in conjunction with foregoing adjuster, provides complete automatic adjustment of the brake, exclusive of the anchors. Ordinarily the anchors only need to be set once during the life of a set of brake linings.

The device 149 comprises a body 71 which is preferably movably secured to the backing plate 12 for initial adjustment, and into which is threaded a screw member 72 extending radially of the brake and provided, near its outer end, with a fine tooth ratchet wheel 74. The outer end of the member 72 is adapted to engage the rim of the brake shoe 116 when it is in retracted position, and a return spring 76 having one end secured to a bracket 78 and the other end secured to the shoe 116 is provided to urge the shoe thereagainst. Pivoted on the body 71, so as to rotate in a plane generally radial of the brake, is a ratchet arm or pawl 80 which I prefer to form of thin spring steel, and which operatively engages the ratchet wheel to rotate it. Formed integrally therewith are two additional arms extending in opposite direction at right angles thereto, one of which, 82, engages the inner edge of the web of the shoe 116, and to the other of which, 84, is secured one end of a light spring 85. The other end of the spring 85 is secured to the bracket 78 fixed on the backing plate. This spring 85 biases the arm 80 in a clockwise direction (the direction in which the pawl engages the teeth of the ratchet wheel 74 to screw the member 72 radially outward). A spring steel pawl 87, rigidly secured to the backing plate and engaging the ratchet wheel 74 prevents the adjuster from "backing up".

Figure 11:
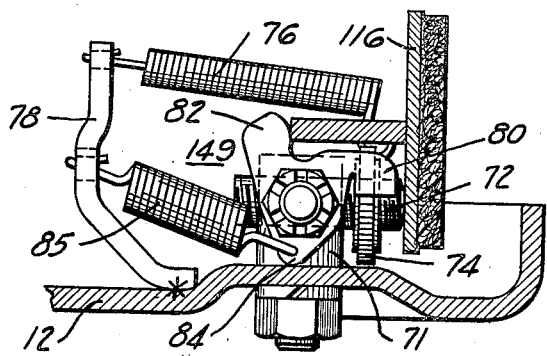
Figure 11 is a partial section on the line 11—11 of Figure 6, showing the automatic centering device in side elevation.

Assuming the brake lining is worn sufficiently to cause adjustment to occur, the operation of this brake is as follows. Application of the brake in forward braking results in translation of the adjuster 138 to the right (Figure 6) and clockwise rotation of the lever 156 (Figure 8), so that it engages a new tooth on the ratchet 142. Upon release of the brake, the spring 76 returns the shoes to centered position so that shoe 116 rests against the centering device screw 72. This results in counterclockwise movement of the arm 156 under the influence of the spring 162, thus rotating the screw 140 thereby expanding the shoes. During successive applications, the pawl slides back and forth on the same tooth until the brake is again sufficiently worn to permit another tooth to be engaged. At the same time, movement of the shoe 116 toward the drum, as the brake is applied, permits the spring 85 to rotate the pawl arm 80 clockwise (Figure 11). Release of the brake, and the return of the shoe 116 by the spring 76, brings the pawl back in a counterclockwise direction. As the brake wears, during successive applications, the pawl will slide back and forth upon the same tooth and will rotate the ratchet wheel 74 a little each time until, upon release of the brake, it engages a new tooth on the wheel. The next application of the brake will then cause the advancement of the wheel by one tooth, resulting in a substantial outward movement of the screw member 72, and thus holding the shoe closer to the drum, whereupon the above-described cycle will be repeated.

Figure 12:
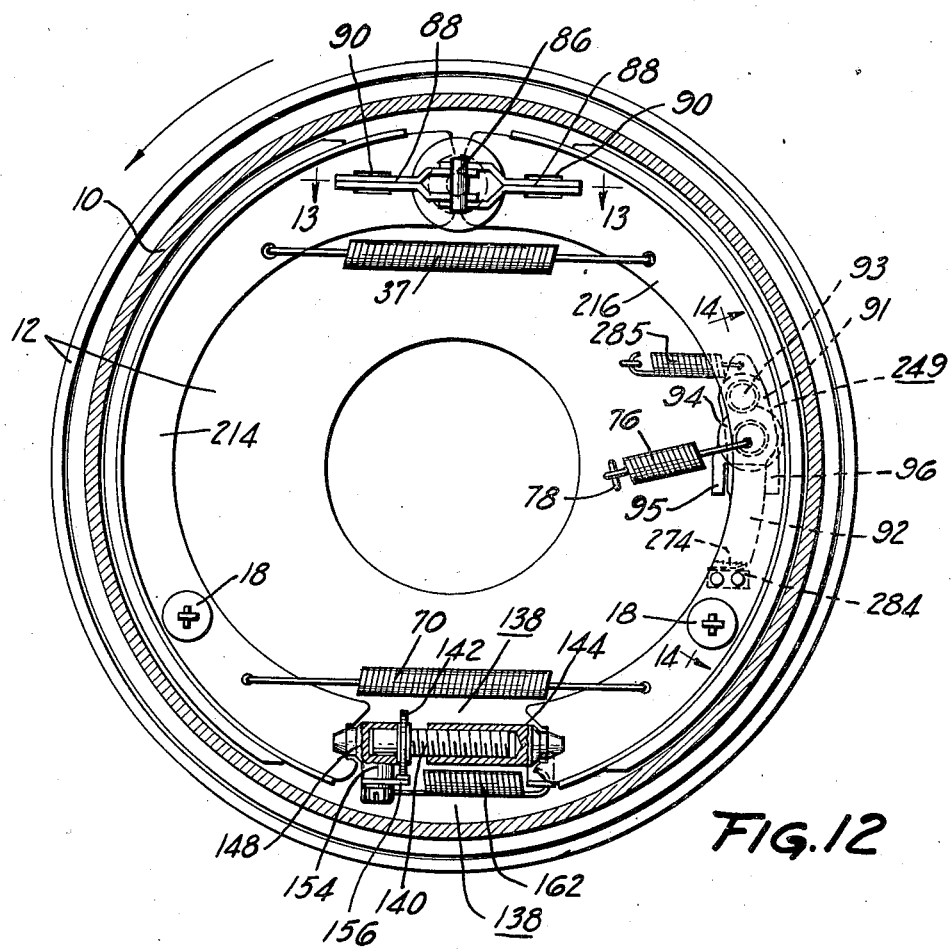
Figure 12 is a section corresponding to Figure 1, but showing another modification.
Figure 13:
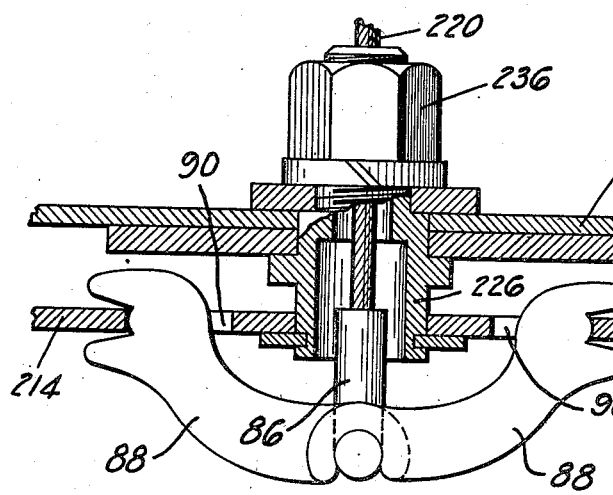
Figure 13 is a partial section on the line 13—13 of Figure 12 through the anchoring and applying means.
Figure 14:
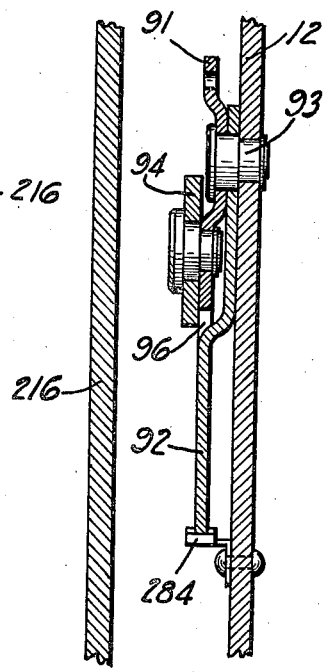
Figure 14 is a partial section on the line 14—14 of Figure 12 through the automatic centering device.

The modification of Figures 12 to 14, in which corresponding parts are designated by the same numeral plus 200, employs a single anchor which may preferably project through a radial slot in the backing plate and be adjustably secured there by a nut 236. A unique mechanical applying device utilizes an operating cable 220 passing into the brake through a bore formed in the anchor. Upon the end of the cable 220 is swaged the stem of a T-shaped fitting 86 the cross member of which engages a novel toggle. The toggle comprises two levers 88 each of which is made up of a pair of stampings spot-welded or otherwise secured together for the greater part of their length, but offset from each other, at the end, which engages the cross-member of the fitting 86, to form a fork having one part extending on one side of the stem of said fitting and the other part on the other side thereof. The parts engaging the fitting are deeply notched for pivotal engagement therewith and one of the forks is made wider and overlaps the other.

The opposite ends of the levers 88 project part way into rectangular openings 90 formed near the ends of the shoes and are notched for thrust engagement with the edges of these openings.

This embodiment employs the same slack adjuster 138 as that employed in the preceding modification, but has a different centering device which is designated by the numeral 249. This comprises two levers 91 and 92 coaxially pivoted on a pin 93 secured in the backing plate 12. As seen in Figure 14 the lower end of the lever 91 carries a roller 94 for engagement with the rim of the brake shoe 216, and tensioned between the upper end of the lever 91 and the backing plate, is a spring 285 which urges this roller into engagement with said rim. Formed integrally with the lever 91 and extending beyond the roller 94 are a pair of parallel spaced projections 95 and 96 forming a fork.

The lever 92 is offset from the backing plate to lie between these projections and is narrower than the space between them by a distance equal to the desired normal clearance of the brake shoe. The lever 92 extends beyond the fork a considerable distance and its end is formed, preferably on an arc centered in the pin 93, with ratchet teeth 274 which engage a spring pawl 284 secured to the backing plate. The usual return spring 76 tensioned between the bracket 78 and the shoe 216 acts to return the shoe to released position against the centering device.

In operation, when the brake is applied and the shoe 216 moves outwardly, the spring 285 causes the arm 91 to swing outwardly, keeping the roller 94 in engagement with the rim of the shoe. This movement will have no effect on the lever 92 as long as normal clearance exists between the shoe and drum, because of the clearance between the projections 95 and 96 and the lever 92 described above. But, if greater movement occurs, on account of wear of the brake lining, the projection 95 will engage the lever 92 and carry it along. If the movement is sufficiently great, the pawl 284 will engage a new tooth 274, so that upon the release of the brake and the return of the shoe by the spring 76, the shoe occupies a new adjusted position radially outward of its old position.

Figure 15:
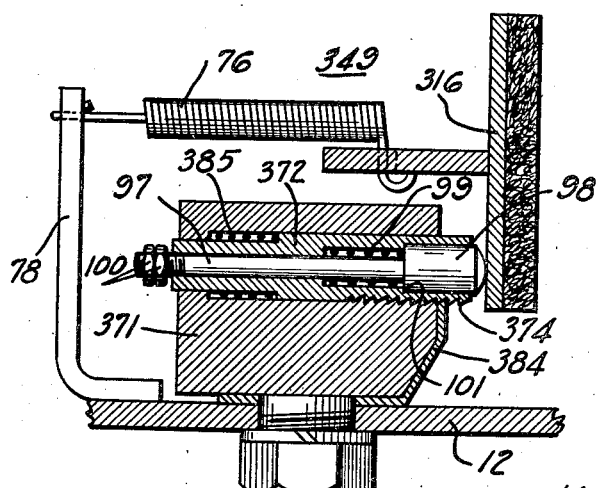
Figure 15 is a partial axial section through a brake, showing in section another form of centering device.
Figure 16:
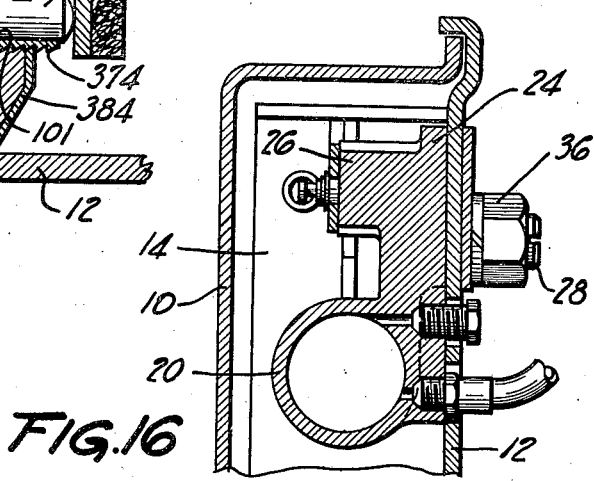
Figure 16 is a partial section on the line 16—16 of Figure 1, transversely through the anchoring and applying means.

Figure 15 illustrates another form of centering device 349 which may be used in place of the devices 149, and 249 previously described. It consists of a body 371, which may be die cast, and which is secured to the backing plate adjacent the rim of the brake shoe 316 by bolts or the like. The body 371 is provided with a two-diameter bore extending radially of the brake and in which is slidably mounted a two-diameter plunger 372 leaving an annular space in which is mounted a compression spring 385 adapted to urge the plunger outward radially of the brake. The plunger 372 is provided with ratchet teeth 374 adapted to be engaged by a flat spring pawl 384, which for convenience and economy, is preferably secured in place by clamping it between the body 371 and the backing plate by the same means which secures the body in position. The ratchet teeth and pawl are arranged to permit the plunger 372 to move radially outward and to restrain inward motion thereof.

The plunger 372 is provided with a three-diameter bore, the smallest diameter being at the inner end and the largest at the outer end. A second plunger having a stem 97 which fits slidably in the smallest bore and projects from the inner end of the plunger 372 and having an enlarged head which fits slidably in the largest bore and is adapted to seat against the shoulder 101 in plunger 372, is adjustably secured in the plunger 372 by means of locknuts 100. The locknuts 100 should be adjusted to permit the plunger 97, 98 to move a distance equal to the desired normal clearance between the shoe 316 and the drum. A spring 99, in the annular space formed between the stem 97 and the intermediate bore of the plunger 372, urges the plunger 97, 98 radially outwardly. This spring must be stronger than the spring 385. The usual return spring 76, tensioned between the shoe 316 and a bracket 78, is provided to urge the shoe to released position against the centering device. This spring is of greater strength than the springs 99 and 385.

In operation, when the brake is applied, and the shoe 316 moves outwardly toward the drum, the stronger spring 99 moves the plunger 98 outwardly, maintaining its contact with the shoe 316. If, due to wear of the brake lining, the shoe moves a distance greater than the normal clearance, the locknuts 100 engage the end of the plunger 372 preventing further relative movement between the two plungers, and the spring 385 forces the plunger 372 outwardly. This movement, if sufficient, will permit the pawl 384 to engage a new tooth 374 and upon release of the brake the plunger 372 will be held in the new position, while the plunger 97, 98 is returned to its original position against the shoulder 101, thus establishing the original normal clearance.

While several illustrative embodiments of the invention have been described in detail, it is not my intention to be limited to those particular embodiments, or otherwise than by the terms of the following claims.

What I claim is:

1. In a brake comprising a drum, a backing plate, and a pair of generally semi-circular shoes having anchorage and applying means between one pair of adjacent ends and an adjusting device floatingly connecting the opposite adjacent ends of the shoes, means for centering the shoes within the drum, an operating lever mounted on said adjusting device, an abutment on the backing plate operatively engaged by said lever when the brake is applied in one direction, and means for yieldingly urging said lever against the abutment.

2. In a brake comprising a drum, a backing plate, and a pair of generally semi-circular shoes having anchorage and applying means between one pair of adjacent ends and an adjusting device floatingly connecting the opposite adjacent ends of the shoes, means for centering the shoes within the drum, a pair of levers mounted on said adjusting device one of which operatively engages said device, lost motion means between the levers, an abutment on the backing plate operatively engaged by the other lever when the brake is applied in one direction, and means for yieldingly urging said other lever against the abutment.

3. In a brake comprising a drum, a backing plate, and a pair of generally semi-circular shoes having anchorage and applying means between one pair of adjacent ends and an adjusting device floatingly connecting the opposite adjacent ends of the shoes, means for centering the shoes within the drum, an operating lever mounted on said adjusting device, an abutment on the backing plate operatively engaged by said lever when the brake is applied in one direction, means for yieldingly urging said lever against the abutment, and means secured to the adjusting device for holding it in adjusted position.

4. In a brake comprising a drum, a backing plate, and a pair of generally semi-circular shoes having anchorage and applying means between one pair of adjacent ends and an adjusting device floatingly connecting the opposite adjacent ends of the shoes, means for centering the shoes within the drum, an operating lever mounted on said adjusting device, an abutment on the backing plate operatively engaged by said lever when the brake is applied in one direction, and means for yieldingly urging said lever against the abutment, the backing plate being provided with an opening adjacent said lever whereby the lever is made accessible from outside the brake for manual adjustment.

5. In a brake comprising a drum, a backing plate, and a pair of generally semi-circular shoes having anchorage and applying means between one pair of adjacent ends, sockets movably secured to the other ends of the shoes, a thrust member between the sockets and threadedly engaging at least one of them, a ratchet wheel secured to said thrust member, a lever pivoted on one of the sockets having a pawl engaging the ratchet wheel, an abutment fixed to the backing plate and operatively engaged by said lever, resilient means urging said lever against the abutment, and resilient means for centering the shoes within the drum when the brake is released.

6. In a brake comprising a drum, a backing plate, and a pair of generally semi-circular shoes having anchorage and applying means between one pair of adjacent ends, right and left hand threaded sockets pivotally secured to the other ends of the shoes, a thrust member between the sockets and threadedly engaging them, a ratchet wheel secured to said thrust member, a lever pivoted on one of the sockets having a pawl engaging the ratchet wheel, a second lever pivoted coaxially with the first, an abutment fixed to the backing plate and operatively engaged by said second lever, lost motion means between the levers, resilient means urging said second lever against the abutment, and resilient means for centering the shoes within the drum when the brake is released.

7. In a brake of the shiftable anchorage type, having friction means and a support for said friction means, a flange secured to the support, a fluid pressure actuating device secured to the flange, and a circumferentially-elongated anchor secured to the flange radially outward of the cylinder, said flange being provided with means for shifting its position whereby the actuating device and the anchor are moved together to adjust the anchor.

8. In a brake of the shiftable-anchorage type, a fluid pressure actuating device and an elongated anchor rigidly secured to each other and movable together to provide adjustment of the anchor.

9. An anchor for a brake adapted to be engaged by adjacent ends of friction device comprising a circumferentially-elongated projection having at each end a partial cylindrical lobe, and means for securing said anchor comprising a pair of eccentrics adjacent said lobes and each individually rotatable to adjust the positions of said lobes.

RUDOLPH A. GOEPFRICH.